United States Patent [19]
Coleman

[11] Patent Number: 5,836,609
[45] Date of Patent: Nov. 17, 1998

[54] HORN SWITCH FOR AIR BAG MODULE

[75] Inventor: Daniel E. Coleman, Mesa, Ariz.

[73] Assignee: TRW Inc., Lyndhurst, Ohio

[21] Appl. No.: 811,313

[22] Filed: Mar. 4, 1997

[51] Int. Cl.[6] .................................................. B60R 21/20
[52] U.S. Cl. ..................... 280/728.3; 280/731; 200/61.54
[58] Field of Search ................................ 280/731, 728.3, 280/728.2, 728.1; 200/61.54

[56] References Cited

U.S. PATENT DOCUMENTS

| | | | |
|---|---|---|---|
| 5,157,372 | 10/1992 | Langford | 338/211 |
| 5,265,904 | 11/1993 | Shelton et al. | 280/731 |
| 5,309,135 | 5/1994 | Langford | 338/211 |
| 5,452,913 | 9/1995 | Hansen et al. | 280/728.1 |
| 5,465,998 | 11/1995 | Davis | 280/731 |
| 5,577,767 | 11/1996 | Nemoto | 280/731 |
| 5,626,358 | 5/1997 | Ricks et al. | 280/731 |

*Primary Examiner*—Peter C. English
*Attorney, Agent, or Firm*—Tarolli, Sundheim, Covell Tummino & Szabo

[57] ABSTRACT

A vehicle occupant safety apparatus (10) for mounting on a portion of a vehicle (12) includes an inflatable vehicle occupant protection device (40). An inflator (30) is actuatable to supply inflation fluid to inflate the inflatable device (40). A cover (70) has a closed condition when the inflatable device (40) is in the deflated condition. The cover (70) is movable from the closed condition to an open condition upon inflation of the inflatable device (40). A wrap (100) is disposed within the cover (70) for maintaining the inflatable device (40) in the deflated condition prior to actuation of the inflator (30). The wrap (100) includes a portion (110) operable to actuate an electrically actuatable device of the vehicle, such as a vehicle horn (102).

6 Claims, 2 Drawing Sheets

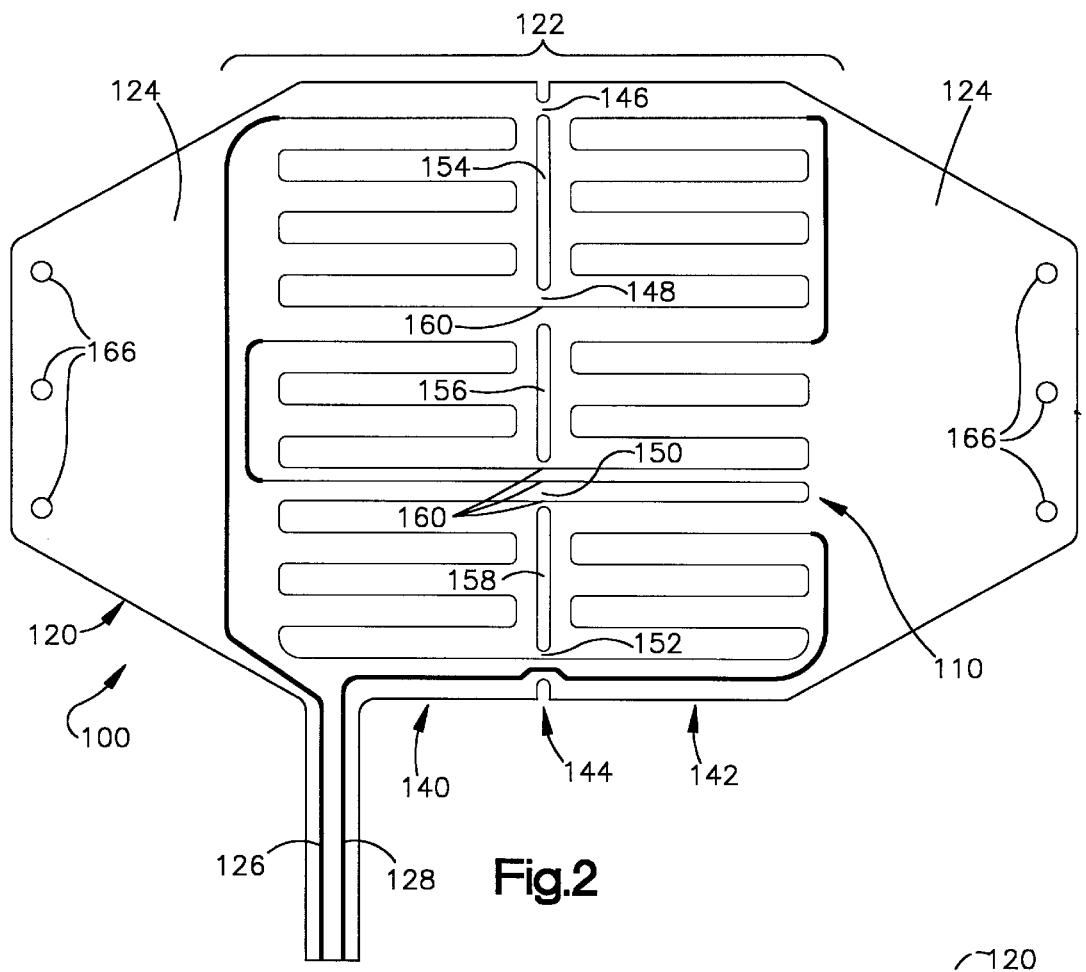
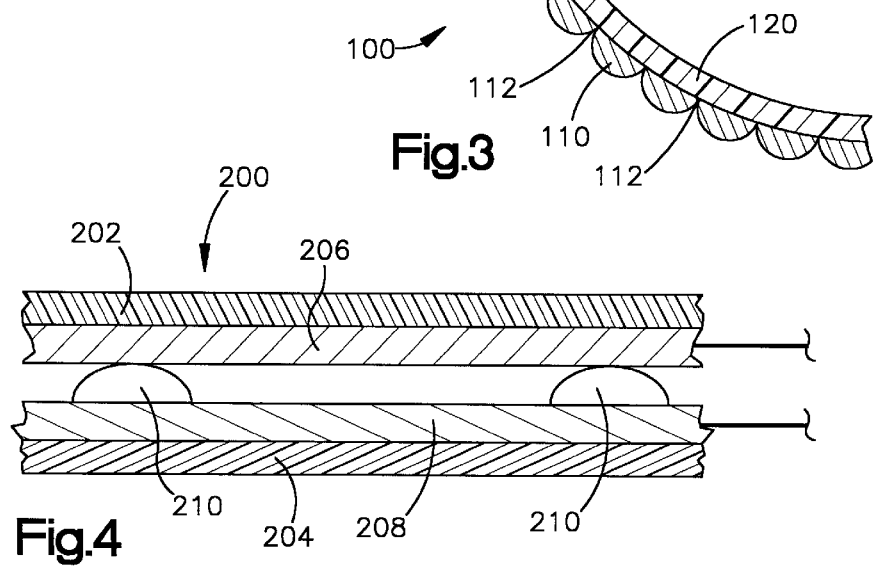
Fig.2
Fig.3
Fig.4

HORN SWITCH FOR AIR BAG MODULE

BACKGROUND OF THE INVENTION

1. Technical Field

The present invention relates to a switch for mounting on a portion of a vehicle as part of a vehicle safety apparatus. In particular, the present invention relates to a horn switch which is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch which is operable by pressing on a cover of an air bag module mounted on a vehicle steering wheel. U.S. Pat. No. 5,309,135 discloses a horn switch which includes a variable resistance conductor adhered to a flexible substrate which is in turn adhered to the inside surface of an air bag cover.

An air bag is, typically, packed tightly into a small volume so as to minimize the overall size of the air bag module. It is known to use a flexible material, having a tear seam, as a bag wrap. The flexible material is wrapped tightly around the deflated air bag, inside the cover of the air bag module, to maintain the air bag in a tightly packed condition prior to actuation of the inflator.

SUMMARY OF THE INVENTION

The present invention is a vehicle occupant safety apparatus for mounting on a portion of a vehicle. The apparatus includes an inflatable vehicle occupant protection device having a deflated condition and an inflated condition. An inflator is actuatable to supply inflation fluid to inflate the inflatable device. A cover has a closed condition when the inflatable device is in the deflated condition. The cover is movable from the closed condition to an open condition upon inflation of the inflatable device. A wrap is disposed within the cover for maintaining the inflatable device in the deflated condition prior to actuation of the inflator. The wrap includes means operable to actuate an electrically actuatable device of the vehicle. In a preferred embodiment, the inflatable device is supported on a vehicle steering wheel, and the electrically actuatable device is a horn of the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a plan view of the switch of FIG. 1;

FIG. 3 is an enlarged schematic view showing parts of the horn switch of FIG. 1 in different positions; and FIG. 4 is a view similar to FIG. 2 showing parts of a horn switch constructed in accordance with a second embodiment of the present invention.

DESCRIPTION OF PREFERRED EMBODIMENTS

Figure 1:
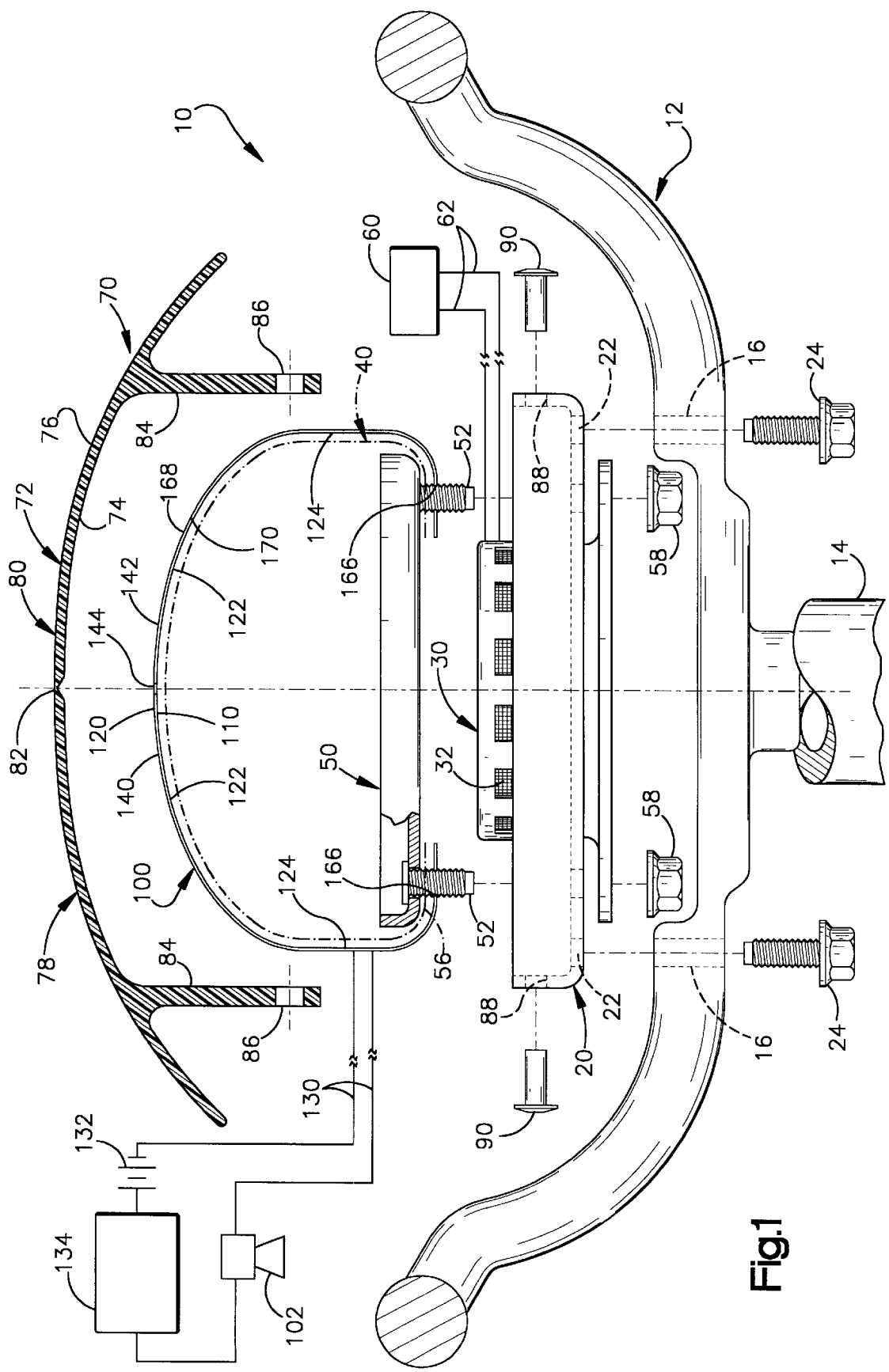
FIG. 1 is a schematic view, partially in section, showing a horn switch as part of an air bag module mounted on a vehicle steering wheel.

The present invention relates to a vehicle safety apparatus including a switch. In particular, the present invention relates to an air bag module which includes a switch for a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 56 of the air bag 40. The retaining ring 50 is secured to the base plate 20 by nuts 58 screwed onto the fasteners 52. The end portion 56 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value. As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable so that it can be deformed inwardly (that is, in a downward direction as viewed in FIG. 1) by pressure from an occupant of the vehicle, so as to actuate an electrical device of the vehicle such as the vehicle horn. Suitable materials include Hytrel (trademark) plastic from E.I. DuPont de Nemours & Co. of Wilmington, Del., and Santoprene (trademark) plastic from Monsanto Company of St. Louis, Mo.

The cover 70 has a main body portion 72 which has inner and outer side surfaces 74 and 76. The main body portion 72 of the cover 70 includes first and second cover parts 78 and 80 separated by an elongate tear seam 82 of the cover. The tear seam 82 constitutes a weakened portion of the cover 70 which is rupturable under the force of the inflating air bag 40 to enable the cover parts 78 and 80 to move away from each other so that the air bag can inflate out of the cover.

A mounting flange or mounting portion 84 of the cover 70 extends from the main body portion 72 in a direction toward the base plate 20. A plurality of rivet openings 86 are formed in the mounting portion 84. The rivet openings 86 in the cover 70 overlie rivet openings 88 in the base plate 20. A plurality of rivets 90 extend through the rivet openings 86 in the cover 70 and through the rivet openings 88 in the base plate 20 and secure the cover to the base plate.

The air bag module 10 includes a structure 100 for actuating an electrically actuatable device of the vehicle, such as a vehicle horn 102. In the preferred embodiment, the structure 100 is a flexible, sheet material, single layer variable potentiometer switch which includes a layer of electrically conductive, variable resistance material 110 (FIG. 2) screen printed onto a substrate 120. The switch 100 is generally of the type shown in U.S. Pat. Nos. 5,157,372 and 5,309,135 and available from Flexpoint, Inc., 6906 South 300 West, Midvale, Utah 84047.

The substrate portion 120 of the switch 100 is an electrically insulating material which is tear resistant and die cuttable. The material of the substrate 120 is able to conform to compound curves and retain the variable resistance material 110. A preferred material for the substrate 120 is Kapton (trademark) polyimide film which is available from DuPont. Other suitable materials include Mylar (trademark) film which is available from DuPont, and Melinex (trademark) polyester film which is available from Imperial Chemical Industries of London, England. The substrate 120 preferably has a thickness of about 1 mil.

The variable resistance material 110 is a material whose electrical conductivity varies when the material is deformed in a particular direction. The preferred variable resistance material 110 is a graphite based ink which develops fissures or cracks (shown schematically at 112 in FIG. 3) when bent. The cracks 112, it is believed, increase the electrical resistance of the ink. The resistance of the variable resistance material 110 increases only when the switch 100 is bent or deformed by force exerted in a downward direction as viewed in FIG. 1. The resistance of the variable resistance material 110 does not increase when the switch 100 is bent or deformed by force exerted in an upward direction as viewed in FIG. 1.

The variable resistance material 110 (FIG. 2) covers only a portion of the substrate 120. Specifically, the switch 100 has an active portion 122 located between a pair of inactive portions 124. The inactive portions 124 of the switch 100 include a plurality of fastener openings 166. The active portion 122 of the switch 100 is that part of the switch which is exposed to force from the vehicle occupant pressing on the cover 70 of the air bag module 10 to operate the switch. In the active portion of the switch 100, a layer of the variable resistance material 110 is deposited on the substrate 120, preferably by screen printing. The variable resistance material 110 is deposited, preferably in a grid pattern as shown in FIG. 2, so as to form a variable resistance conductor between a pair of conductive traces 126 and 128.

A pair of lead wires 130 (FIG. 1) or other known type of electrical conductor are electrically connected with the conductive traces 126 and 128 on the switch 100. The lead wires 130 connect the horn switch 100 with the vehicle horn 102, with a power source 132 such as the vehicle battery, and with vehicle electric circuitry indicated schematically at 134.

The switch 100 (FIG. 2) includes first and second switch parts 140 and 142 which are separated by an elongate tear seam or rupturable portion 144 of the switch. The tear seam includes a linear series of connector sections 146, 148, 150 and 152 separated by a series of elongate slots 154, 156 and 158. The connector sections 146–152 extend between and interconnect the first and second switch parts 140 and 142. The number, length, and spacing of the connector sections 146–152 and of the slots 154–158 may be varied to control the amount of force needed to rupture the rupturable portion 144 of the switch 100.

The rupturable portion 144 of the switch 100 forms a stress riser in the switch. Specifically, the rupturable portion 144 of the switch 100 is a predetermined weakened portion of the switch which is rupturable under less force than is needed to rupture other, surrounding, portions of the switch. This area of predetermined weakness, or stress riser, in the switch 100 results from the presence of the slots 154–158. As a result, upon inflation of the air bag 40, the switch 100 opens, in a predetermined manner, at the rupturable portion 144 rather than at any other location.

The two inner connector sections 148 and 150 of the switch 100 are active—that is, portions 160 of the electrically conductive, variable resistance material 110 are located on each one of the connector sections 148 and 150. As a result, when pressure is exerted upon one of the connector sections 148 and 150, the resistance of the switch 100 varies. These two connector sections 148 and 150 are located at or near the center of the vehicle steering wheel 12 when the switch 100 is installed in the air bag module 10, and thus are likely to receive force when the vehicle occupant presses at or near the center of the cover 70 to sound the horn 102.

The switch 100, in addition to being operable to actuate the vehicle horn 102, also functions as a bag wrap. It is, typically, necessary to pack an air bag tightly into a small volume so as to minimize the overall size of an air bag module, especially a module mounted on a vehicle steering wheel.

During assembly of the air bag module 10, the switch 100 is wrapped around the air bag 40 with the conductive material 110 inside, that is, facing the air bag. The dimensions of the switch 100, including the distance between the fastener openings 166, are selected so that the switch is wrapped tightly around the deflated, packed air bag 40 when the switch is connected with the retaining ring 50 as shown in FIG. 1. The fasteners 52 on the retaining ring 50 extend through the fastener openings 166 in the switch 100. When the nuts 58 are screwed onto the fasteners 52, the inactive portions 124 of the switch are clamped between the base plate 20 and the retaining ring 50. As a result, the switch 100 functions as a wrap which maintains the air bag 40 in a tightly packed condition prior to assembly of the module 10 and actuation of the inflator 30. An outer side surface 168 of the switch 100 is pressed against the inner side surface 74 of the cover to minimize any air gap between the switch and the cover. The elongate tear seam 82 of the cover 70 overlies and extends parallel to the elongate tear seam 144 of the switch 100.

When the ignition switch of the vehicle is turned on, the vehicle electric circuitry 134 senses the electrical resistance of the switch 100 and sets this as a "baseline" level of resistance. Therefore, when the switch 100 is wrapped tightly around the folded, packed air bag 40 and is in contact with the cover 70, the vehicle horn 102 is not actuated.

Specifically, the force of the packed air bag 40, pressing the switch 100 outward against the cover 70, does not vary the resistance of the variable resistance material 110 so as to energize the vehicle horn 102.

To effect operation of the vehicle horn 102, the driver of the vehicle presses on the cover 70 of the air bag module 10 in a downward direction as viewed in FIG. 1. The force applied to the cover 70 of the air bag module 10 is transmitted through the cover to the switch 100.

The switch 100 deforms under the force transmitted through the cover 70. When the switch 100 deforms, the electrical resistance of the conductive material 110 increases. This change in the resistance of the switch 100 is sensed by the vehicle electric circuitry 134. The vehicle horn 102 is energized.

When the force on the cover 70 of the air bag module 10 is released, the resilience of the cover 70 causes it to move away from the air bag 40. As this movement occurs, the switch 100 returns to its original, undeformed condition. The electrical resistance of the conductive material 110 returns to its first level. This change in the resistance of the switch 100 is sensed by the vehicle electric circuitry 134. The horn 102 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of the inflator 30 through the fluid outlets 32 and into the air bag 40. The rapidly flowing inflation fluid causes the air bag 40 to inflate in an upward direction as viewed in FIG. 1.

The force of the inflating air bag 40 is applied against the inside of the switch 100. Specifically, the inflating air bag 40 pushes outward against an inner side surface 170 of the switch 100, on both the first switch part 140 and the second switch part 142.

The force of the inflating air bag 40 attempts to open the switch 100 to allow the air bag to inflate out of the switch. The switch 100 opens at the rupturable portion 144, which is the predetermined weakened portion of the switch. The connector sections 146–152 of the rupturable portion 144 break. The inactive portions 124 of the switch 100 act as hinges about which the first and second switch parts 140 and 142 move away from each other into an open condition (not shown).

The opening of the switch 100 enables the first and second switch parts 140 and 142 to move away from each other so that the air bag 40 can inflate out of the switch. The inactive portions 124 of the switch 100, which are clamped to the retaining ring 50, keep the switch parts 140 and 142 from moving away from the air bag module 10 into the interior of the vehicle.

The force of the inflating air bag 40 is also applied against the inside of the cover 70. Specifically, the inflating air bag 40 transmits force through the switch 100 against the inner side surface 74 of the main body portion 72 of the cover 70, on both the first cover part 78 and the second cover part 80.

The force of the inflating air bag 40 attempts to open the cover 70 to allow the air bag to inflate out of the cover. The cover 70 opens at the rupturable portion 82, which is the predetermined weakened portion of the cover. The rupturable portion 82 breaks, and the first and second cover parts 78 and 80 move away from each other into an open condition (not shown). The cover 70 opens sufficiently that the air bag 40 inflates between the first and second cover parts 78 and 80 into a position to help protect the vehicle occupant.

The switch 100 can be used to actuate an electrically actuatable device of the vehicle other than the vehicle horn 102. For example, the switch 100 could be used to actuate or control the vehicle radio, speed control, etc. Alternatively, the switch 100 could have a plurality of electrically independent active areas for controlling a plurality of electrically actuatable devices including the vehicle horn 102.

Other structures can, alternatively, be used as a bag wrap, as described herein, so long as they are configurable to actuate the electrically actuatable device of the vehicle only when the vehicle occupant presses on the cover 70 of the air bag module 10. As an example, FIG. 4 illustrates schematically an active portion of a known membrane switch 200 which includes two layers of substrate 202 and 204. An electrode or layer of conductive material 206 is disposed on the substrate layer 202. An electrode or layer of conductive material 208 is disposed on the substrate layer 204. Standoffs 210 normally separate the electrode 206 from the electrode 208 in the active area of the switch 200, which is located at the center area of the cover 70. Other areas of the switch 200, which wrap around the folded, packed air bag and which are fastened to the other parts of the module, are electrically inactive. When an external force is applied to the active area of the switch 200, the electrodes 206 and 208 move into contact with each other and complete an electric circuit. The completion of the electric circuit can be used to actuate an electrically actuatable device of the vehicle, such as the vehicle horn 102 (FIG. 1).

From the above description of the invention, those skilled in the art will perceive improvements, changes and modifications in the invention. For example, the present invention is not limited to an air bag module which is mounted on a vehicle steering wheel. The present invention can be used with an air bag module mounted on a vehicle instrument panel, a vehicle seat or door panel, or other portion of the vehicle. Also, the inner surface of the cover may have ribs or other projections for concentrating the force applied by the vehicle occupant to effect a sharper or more distinct bending of the conductive material of the switch. Such improvements, changes and modifications within the skill of the art are intended to be covered by the appended claims.

Having described the invention, I claim:

1. A vehicle occupant safety apparatus for mounting on a portion of a vehicle, said apparatus comprising:

an inflatable vehicle occupant protection device having a deflated condition and an inflated condition;

an inflator actuatable to supply inflation fluid to inflate said inflatable device from the deflated condition to the inflated condition;

support means for supporting said inflator and said inflatable device on the vehicle portion;

a cover having a closed condition when said inflatable device is in the deflated condition, said cover being movable from the closed condition to an open condition upon inflation of said inflatable device; and a wrap within said cover for maintaining said inflatable device in the deflated condition prior to actuation of said inflator;

said wrap including means operable to actuate an electrically actuatable device of the vehicle, said wrap and said means operable to actuate an electrically actuatable device comprising a flexible, electrically insulating sheet material with a layer of electrically conductive, variable resistance material adhered onto said flexible sheet material and whose electrical conductivity varies when deformed;

a retaining ring; and fasteners which extend from said retaining ring through openings in said occupant protection device and said flexible sheet material.

2. A safety apparatus as set forth in claim 1 including a vehicle steering wheel on which said inflatable device is supported, said electrically actuatable device being a horn of the vehicle.

3. A safety apparatus as set forth in claim 1 wherein an outer side surface of said wrap is pressed against an inner side surface of said cover by said deflated inflatable device, the resistance characteristics of said variable resistance material being sensed by vehicle electric circuitry of said apparatus so that the force of said deflated inflatable device pressing said wrap against said cover does not cause actuation of said electrically actuatable device.

4. A vehicle occupant safety apparatus for mounting on a portion of a vehicle, said apparatus comprising:

an inflatable vehicle occupant protection device having a deflated condition and an inflated condition;

an inflator actuatable to supply inflation fluid to inflate said inflatable device from the deflated condition to the inflated condition;

support means for supporting said inflator and said inflatable device on the vehicle portion;

a cover having a closed condition when said inflatable device is in the deflated condition, said cover being movable from the closed condition to an open condition upon inflation of said inflatable device; and a wrap within said cover for maintaining said inflatable device in the deflated condition prior to actuation of said inflator;

said wrap including means operable to actuate an electrically actuatable device of the vehicle;

said means operable to actuate an electrically actuatable device including a layer of electrically conductive, variable resistance material on a flexible substrate, the electrical resistance of said material being variable in response to force applied to said cover to cause actuation of said electrically actuatable device;

an outer side surface of said wrap being pressed against an inner side surface of said cover by said deflated inflatable device, the resistance characteristics of said variable resistance material being sensed by vehicle electric circuitry of said apparatus so that the force of said deflated inflatable device pressing said wrap against said cover does not cause actuation of said electrically actuatable device;

said wrap including first and second parts which are separated by a rupturable portion of said wrap, said rupturable portion of said wrap including at least one rupturable connector section, said means operable to actuate an electrically actuatable device comprising variable resistance material on said rupturable connector section.

5. A vehicle occupant safety apparatus for mounting on a portion of a vehicle, said apparatus comprising:

an inflatable vehicle occupant protection device having a deflated condition and an inflated condition;

an inflator actuatable to supply inflation fluid to inflate said inflatable device from the deflated condition to the inflated condition;

support means for supporting said inflator and said inflatable device on the vehicle portion;

a cover having a closed condition when said inflatable device is in the deflated condition, said cover being movable from the closed condition to an open condition upon inflation of said inflatable device; and a wrap within said cover for maintaining said inflatable device in the deflated condition prior to actuation of said inflator;

said wrap including means operable to actuate an electrically actuatable device of the vehicle;

said cover including first and second cover parts separated by a rupturable portion of said cover, said wrap including a rupturable portion which is aligned with said rupturable portion of said cover, said means operable to actuate an electrically actuatable device comprising variable resistance material on said rupturable portion of said wrap.

6. A vehicle occupant safety apparatus for mounting on a portion of a vehicle, said apparatus comprising:

an inflatable vehicle occupant protection device having a deflated condition and an inflated condition;

an inflator actuatable to supply inflation fluid to inflate said inflatable device from the deflated condition to the inflated condition;

support means for supporting said inflator and said inflatable device on the vehicle portion;

a cover having a closed condition when said inflatable device is in the deflated condition, said cover being movable from the closed condition to an open condition upon inflation of said inflatable device; and an electrical circuit operable to actuate an electrically actuatable device of the vehicle;

said electrical circuit including a portion comprising a wrap within said cover for maintaining said inflatable device in the deflated condition prior to actuation of said inflator;

said electrical circuit portion comprising a wrap including first and second parts of said wrap which are separated by a rupturable portion of said wrap, said rupturable portion of said wrap including at least one rupturable connector section, said electrical circuit including variable resistance material on said at least one rupturable connector section.

* * * * *